Nov. 19, 1935.     W. G. HILLEN ET AL     2,021,727
DIFFERENTIAL CONTROL DEVICE
Filed Dec. 14, 1932     5 Sheets-Sheet 1
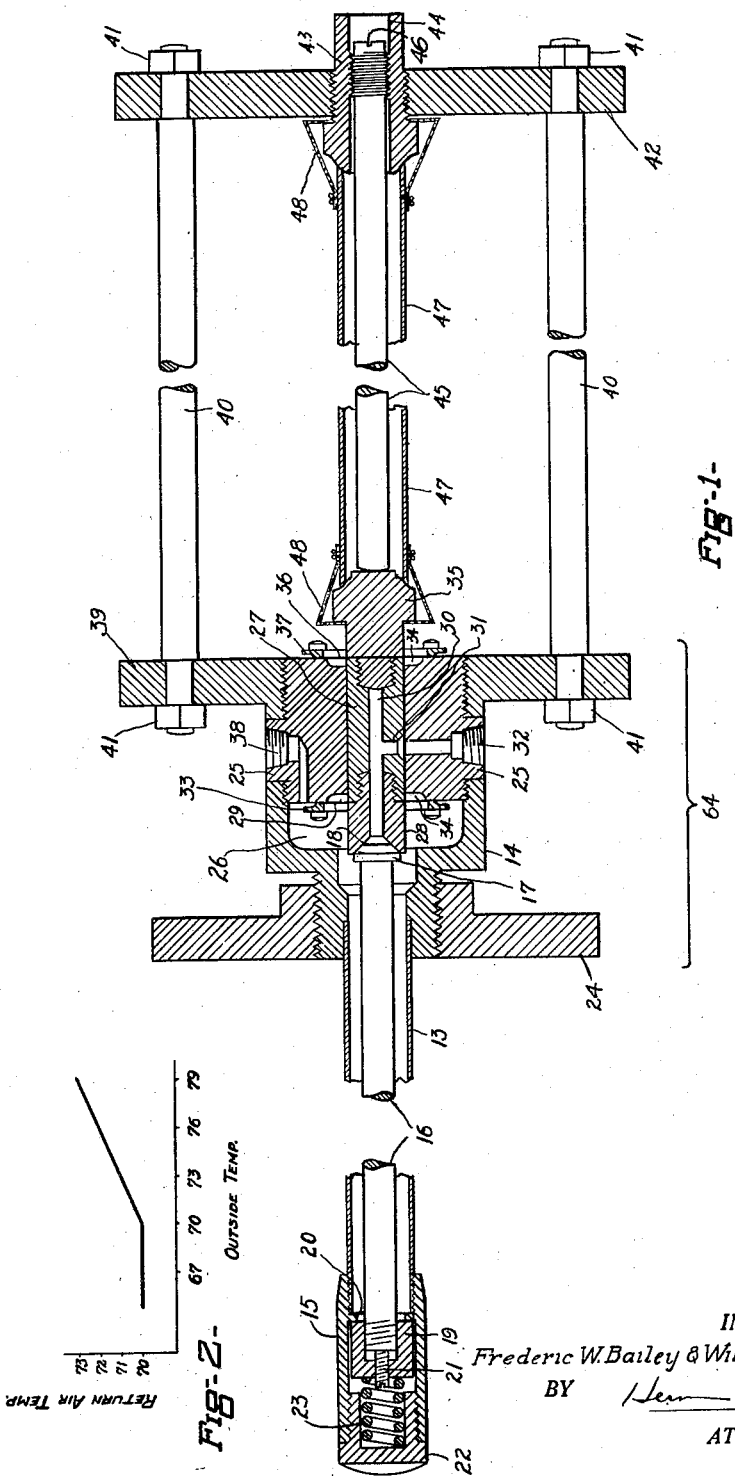
INVENTOR.
Frederic W. Bailey & William G. Hillen
BY
ATTORNEY Nov. 19, 1935.  W. G. HILLEN ET AL  2,021,727
DIFFERENTIAL CONTROL DEVICE
Filed Dec. 14, 1932  5 Sheets-Sheet 2
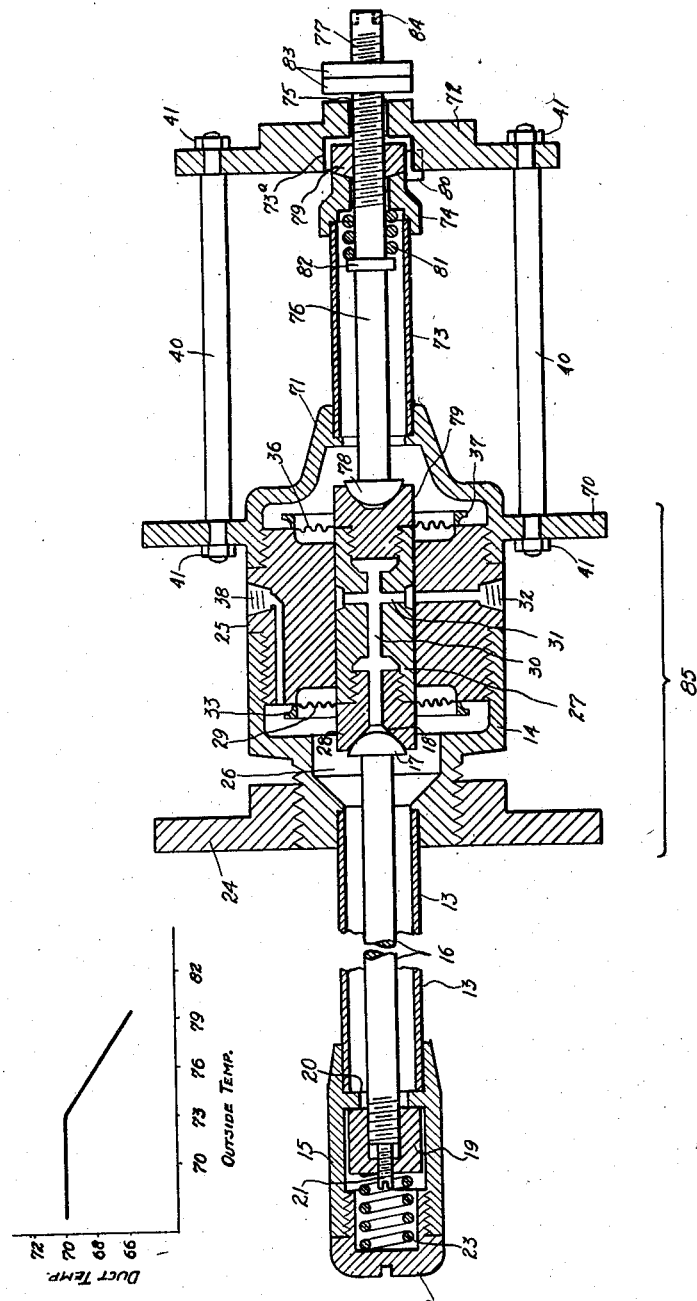
INVENTOR.
Frederic W. Bailey & William G. Hillen
BY
ATTORNEY Nov. 19, 1935.  W. G. HILLEN ET AL  2,021,727
DIFFERENTIAL CONTROL DEVICE
Filed Dec. 14, 1932   5 Sheets-Sheet 3
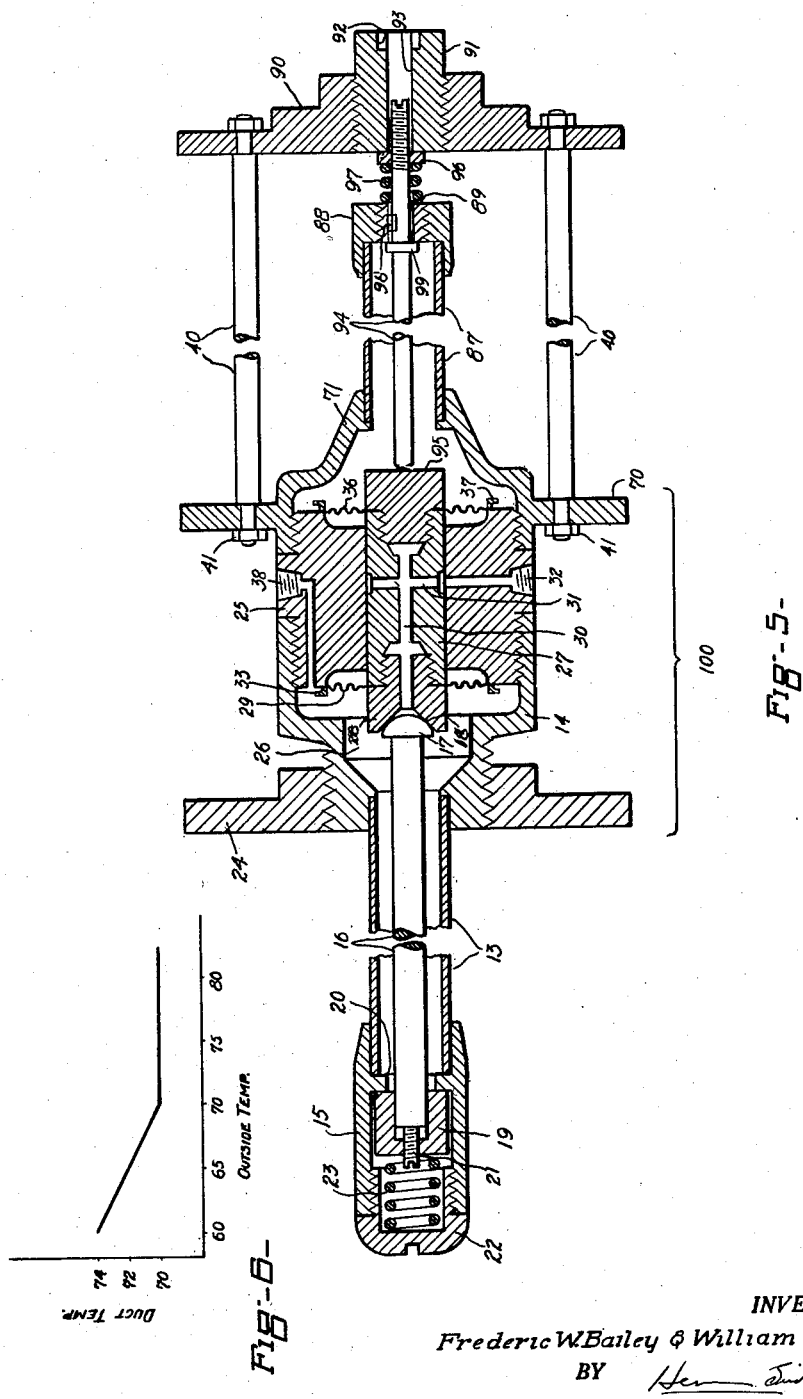
INVENTOR.
Frederic W. Bailey & William G. Hillen
BY
ATTORNEY

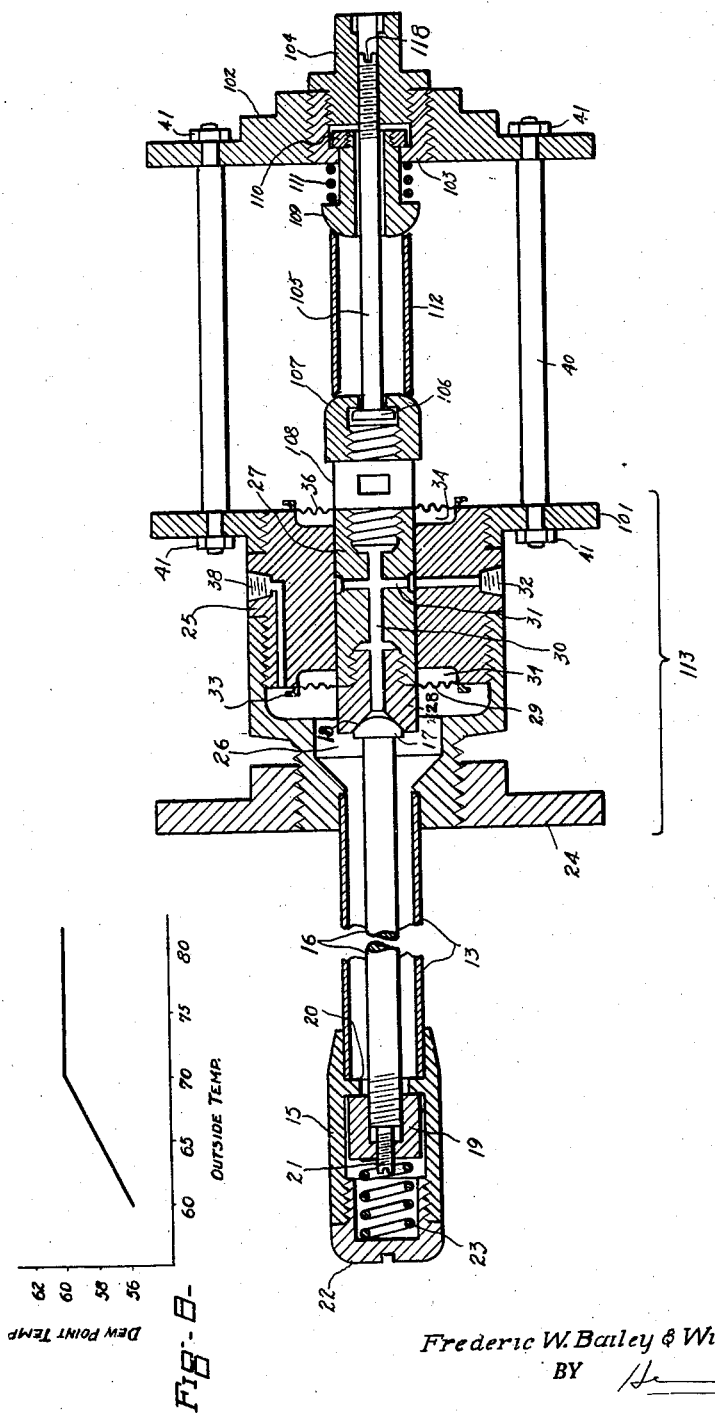

Nov. 19, 1935.  W. G. HILLEN ET AL  2,021,727
DIFFERENTIAL CONTROL DEVICE
Filed Dec. 14, 1932   5 Sheets-Sheet 5
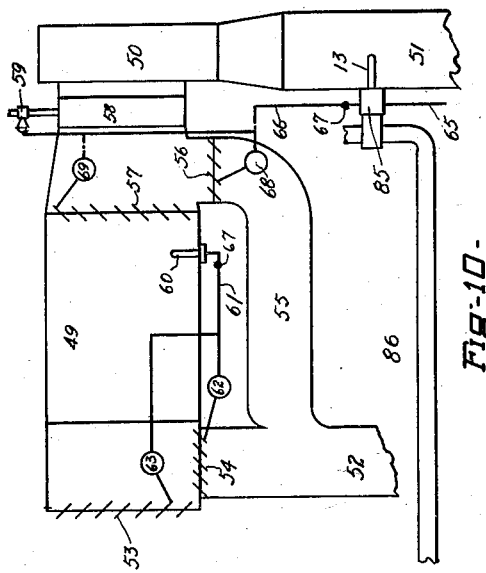
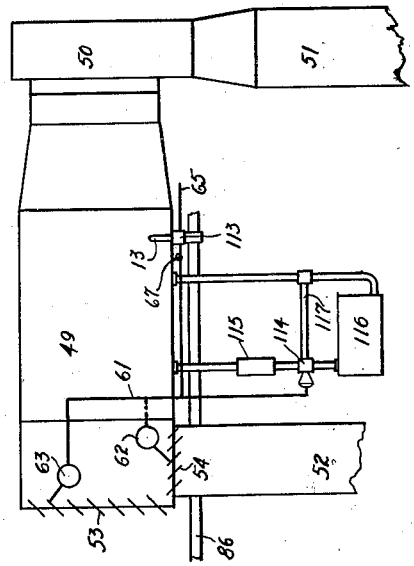
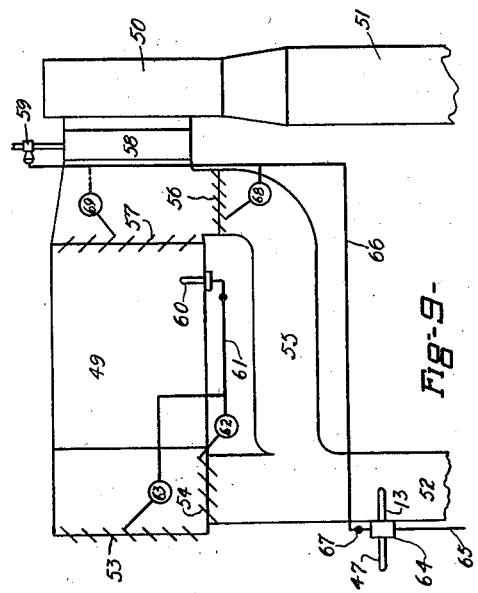
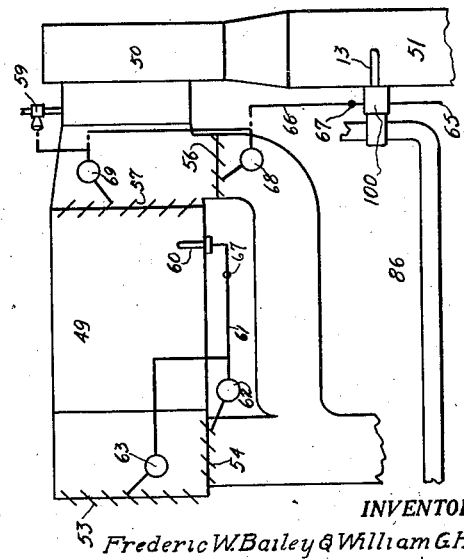
INVENTOR.
Frederic W. Bailey & William G. Hillen
BY
ATTORNEY Patented Nov. 19, 1935

2,021,727

UNITED STATES PATENT OFFICE 2,021,727

DIFFERENTIAL CONTROL DEVICE

William G. Hillen, Shiba-Ku, Tokyo, Japan, and Frederic W. Bailey, East Orange, N. J., assignors, by mesne assignments, to Carrier Engineering Corporation, Newark, N. J., a corporation of New York Application December 14, 1932, Serial No. 647,186

11 Claims. (Cl. 236—91)

This invention relates to the control of the temperature of one fluid in accordance with uncontrolled changes in the temperature of a second fluid, and further, the invention relates to a new and improved apparatus for providing such control.

The principal object of the invention is to provide a control system in which the temperature of one fluid may vary in response to variations in the temperature of another fluid.

Another object of the invention is to provide a control system in which a differential between two mediums is established, the differential varying in accordance with variations in the temperature of one of the mediums.

Still a further object is to provide a control system which will maintain one medium at a constant temperature until a second medium reaches a predetermined temperature at which time the temperature of the first medium will vary in accordance with variations in the temperature of the second medium.

Another object of the invention is to provide a single control instrument in which two thermoresponsive elements oppose each other in such a manner that the pressure of a fluid controlled by the instrument is affected by both elements.

A feature of the invention resides in the provision of a control instrument in which frictional packing and stuffing boxes have been eliminated.

Another feature resides in balancing the pressures within the instrument in such a way that a high degree of sensitivity is secured.

A further feature resides in the provision of a control instrument having two thermostatic elements and providing a means at one end of one of the elements for varying independently the action of either element.

Still another feature resides in the provision of a control instrument having two thermostatic elements composed of the same material, one of the elements being longer than the other, so that one element may expand a greater amount, per unit of temperature variation, than the other element.

Other objects and features relating to novelty in design and construction will be more apparent from the following description and drawings, in which:

Fig. 1 is a fragmentary sectional view of one form of the invention,

Fig. 2 is a diagrammatic illustration of the variations in temperature of one medium, under the control of an instrument such as illustrated in Fig. 1, with respect to a second medium, Fig. 3 is a fragmentary plan view, partly in section, of another control instrument embodying the principles of the invention, Fig. 4 is a diagrammatic illustration of how the temperature of one medium may be caused to vary with respect to the temperature of another medium by an instrument such as shown in Fig. 3, Fig. 5 shows a sectional plan view of another control instrument embodying the principles of the invention, Fig. 6 shows the manner in which the temperature of one medium may be caused to vary with respect to another medium when an instrument such as illustrated in Fig. 5 is influenced by the temperatures of both mediums, Fig. 7 is a sectional plan view adapted to carry out the invention when applied to a control system in which it is desired to vary the temperature of one medium with respect to another, as shown in the temperature diagram of Fig. 8, Fig. 9 illustrates an air conditioning system having a temperature control system embodying the instrument shown in Fig. 1 and adapted to vary the temperature within an enclosure according to the diagram of Fig. 2, Fig. 10 shows a diagrammatic view of an air conditioning system in which some of the temperature affecting instrumentalities are operated by an instrument such as shown in Fig. 3 according to the temperature diagram of Fig. 4, Fig. 11 represents an air conditioning system in which an instrument, such as shown in Fig. 5, comprises an element of the temperature control system adapted to vary the temperature of air discharged from the system in accordance with the temperature diagram of Fig. 6, and Fig. 12 illustrates, in diagrammatic form, an air conditioning system in which an instrument of the type shown in Fig. 7 is adapted to vary the apparatus dewpoint temperature in accordance with the temperature diagram of Fig. 8.

Before going into an extended discussion of the constructional details of the thermostats of Figs. 1, 3, 5 and 7, a brief discussion of the underlying principles is thought advisable.

The various thermostats shown (Figs. 1, 3, 5 and 7) are of the type designed to vary the pressure of a compressed fluid, such as air, in response to temperature changes. In effect, the thermostats are air valves. In each of the instruments, the head portion, or closure member, is operatively attached to a thermostatic element which, responding to changes in temperature of a medium affecting the element, moves the head away from or towards a seat. Further, in each of the instruments, the seat is operatively connected to a second thermostatic element which, responding to changes in temperature of a second medium, moves the seat away from or towards the head. Thus, by having both the head and the seat movable, and by having two thermostatic elements responding to changes in temperature in two mediums, it is apparent that the pressure of a fluid passing through the valve is affected by changes in temperature in both mediums.

This variation in pressure may be utilized, for example, in an air conditioning system, to operate various temperature affecting elements, such as heaters, water valves, dampers, and the like, to control the temperature of one of the mediums affecting the instrument when either or both the head and/or the seat move to vary the pressure.

With particular reference to Fig. 1, similar designations referring to similar parts, 13 represents a metal tube having a relatively large coefficient of expansion, securely attached at one of its ends to the interior of a hollow casting 14. Threaded, or otherwise suitably attached, on the other end of the tube 13 is a tubular extension member 15. Within the tube, and coaxial therewith, is a metal rod 16, preferably invar, but necessarily a material having a coefficient of expansion smaller than the coefficient of expansion of the tube 13. One end of the rod 16 has formed thereon a head 17 adapted to cooperate with a seat 18, as will be hereinafter described, and the other end is threaded into a crown 19. The crown 19 fits loosely within the tubular extension 15 and is adapted to be engaged by shoulders 20, formed on the inner surface of extension 15. A screw 21, threaded through the top of crown 19 engages the end of rod 16 and provides a means of adjusting the rod and locking it in position. A cap 22 is threaded into the end of extension 15 in such a manner as to form a fluid tight closure member, and a light spring 23 cooperates with the cap to force the crown 19 against the shoulders 20.

A flange 24 is threaded on the end of the hollow casting 14 in such a manner that the instrument may be fastened to a suitable panel, as by clamping the panel between flange 24 and the casting 14.

Into the other end of the casting 14, a second casting 25 is threaded, thereby forming a chamber 26. The casting 25 has a smooth cylindrical bore adapted to receive the plunger 27. A plug 28, having a ground seat 18 formed in one end is threaded into the plunger 27 and is adapted to securely clamp a diaphragm 29 therebetween. An axial passageway 30 is drilled through the plunger 27 and the plug 28 communicating with a radial passageway 31 in the plunger 27. The passage 31 in turn communicates with a discharge passage 32, formed in the casting 25, the outer end of which is enlarged and may be threaded to receive the end of a suitable pipe or tube (not shown). Similarly, a passageway 38, enlarged and threaded at its outer end, is adapted to admit a fluid under pressure, from any suitable source, to the chamber 26.

At the opposite end of the plunger 27, a plug 35 is threaded therein and engages and securely holds a second diaphragm 36. The plug 35 also serves to cover the end of the passageway 30. The other end of the plug 35 has an enlarged head formed thereon. The head is partially rounded, as illustrated, and terminates in a flat anvil.

The diaphragm 29 has its periphery tightly fastened, as by a clamping ring 33, to the inner face of the casting 25. In a like manner, the diaphragm 36 is secured to the outer face of casting 25 by the clamping ring 37. The casting is recessed at both ends, as indicated by the reference numeral 34, so that the plunger may move backward and forward as will be hereinafter described.

The casting 25 has threaded on its outer end, although obviously, it might be formed integrally therewith, a flange 39. Near the periphery of the flange 39 a series of holes are formed adapted to receive the reduced end portions of support rods 40. Nuts 41 are threaded on the rods 40 to securely fasten the rods to the flange 39. In a similar manner, another flange 42 is secured to the opposite ends of the rods 40.

At the center of the flange 42, a hollow plug 43 is threaded therein, the outer end of the plug having an enlarged keyway 44 in which a key may be inserted to enable the plug 43 to be rotated. The inner end of plug 43 is enlarged and rounded, as illustrated, the purpose of which will be hereinafter described. The plug 43 is internally threaded to engage corresponding threads on a rod 45 and the rod is provided at one end with a keyway 46 whereby the rod may be rotated. Applicant prefers to make the rod 45 and the support rods 40 of invar. Although other metal may be used, it is of particular importance that these rods 45 and 40 be of the same material or materials having the same coefficient of expansion. A tube 47, preferably, but not necessarily, made of the same metal as the tube 13, is loosely supported by, but not attached to, the rounded portions of the plugs 35 and 43. Silk reducing cones 48 are attached to each end of the tube 47 to keep out dust, dirt, and other extraneous matter.

The tubes 13 and 47 may be made of the same material or they may be made of materials having different coefficients of expansion, and further, they may be of equal or different lengths. In the illustration (Fig. 1), applicant has chosen, for purposes which will later be made apparent, to describe tube 13 as being three times as long as tube 47 and as being made of the same material. In that the tubes have the same coefficient of expansion (inches per inch per degree) but are of different lengths, the rate of expansion (inches per degree) of tube 13 will be three times the rate of expansion of tube 47. Hence, for one degree rise in temperature, tube 13 will expand three times as much as tube 47.

With reference to Fig. 9, numeral 49 designates an air washer including one or more banks of sprays through which air may be passed to heat, cool, humidify, dehumidify and/or clean in a manner well known in the air conditioning art. A fan 50 is adapted to draw a combination of fresh and return air through dampers 53 and 54 respectively, through the air washer and deliver the combination to an enclosure through a duct 51. A volume of return air may bypass the air washer through duct 55 to augment and attemperate the air from the washer, the mixture being controlled by dampers 56 and 57 respectively. A reheater 58 is adapted to supply any heat required under the control of a device such as valve 59. Thermostat 60, of well known design is adapted to vary the pressure of compressed air in the line 61 and hence, vary the air pressure on the diaphragm motors 62 and 63, in response to changes of dewpoint temperature in 49. Air motor 62 is adapted to operate the return air dampers 54 and similarly, 63 operates outside air dampers 53. By varying the proportions of washed air and bypassed air and by varying the amount of heat added by reheater 58, the temperature of the air delivered to the enclosure may be regulated, both in summer and winter.

To illustrate this regulation in connection with the invention, a differential thermostat of the type shown in Fig. 1, generally designated 64, is mounted in the return air duct 52 with the thermal tube 13 subjected to the temperature in the duct and the tube 47 influenced by the temperature of outside air. The line 65 represents a pipe leading from a source of compressed air to the entrance passage 38 of the thermostat, and the line 66, having a "leak" device 67 therein, connects the discharge passage 32 of the thermostat 64 to the air motor 68, adapted to operate bypass damper 56 the air motor 69 adapted to operate air washer damper 57, and the diaphragm valve 59. Valve 59 is of the type which is held open by a spring and is closed by an increase in air pressure on its operating diaphragm. As contemplated in this particular instance, valve 59 will be completely open when there is no air pressure on line 66; will start to close when the pressure reaches 2 pounds per square inch and will be fully closed when the pressure reaches 5 pounds per square inch. Likewise, the dampers 56 are adapted to be open when there is no air pressure on the motor 68. The motor 68 will start to close the dampers when the pressure in line 66 rises above 5 pounds per square inch and the dampers will be closed a maximum amount when the air pressure reaches 10 pounds per square inch. Motor 69 operates the air washer dampers 57 conversely, that is, the dampers are open a minimum amount when the air pressure is below 5 pounds per square inch and the dampers will be fully opened when the pressure reaches 10 pounds per square inch.

Considering the specific operation of the thermostat 64, this instrument is designed to control the pressure of compressed air so that the variation in air pressure will cause the steam valves 59 and dampers 56 and 57 to operate to control the temperature of air delivered to the enclosure according to a temperature curve such as the curve of Fig. 2. That is, it is designed to hold a constant temperature within the enclosure until the temperature outside the enclosure rises above a predetermined point. Then the instrument will function to increase the temperature in the enclosure as the outside temperature increases.

As can be seen (Fig. 1) air pressure in the chamber 26, remembering that this air is compressed above atmospheric pressure, tends to force diaphragm 29, consequently plunger 27 and its associated parts, to the right until the head 35 engages the end of tube 47 or rests against the end of rod 45. By rotating the rod 45, the plunger 27 and seat 18 are moved until air pressure in the line 66 closes valve 59 and operates the dampers so that a desired temperature, for example 70° F., is established in the duct 51. It is apparent that any change in temperature in the enclosure will be reflected by an immediate change in temperature of the return air affecting thermal tube 13. Obviously, if the temperature in 52 rises, tube 13 will expand, shoulders 20 will engage crown 19 and pull the invar rod 16 and its head 17 away from the seat 18. This opening of the air valve will increase the pressure in line 66 and this increase in pressure will operate to close valve 59 and dampers 56 and to open dampers 57, thereby lowering the temperature of the air supplied to the enclosure. Conversely, should the temperature in duct 52 decrease, tube 13 will contract, rod 16 and head 17 will be carried towards its seat, thereby closing the valve. To prevent head 17 from jamming against seat 18 and possibly ruining the instrument, a spring 23 is placed between the crown 19 and cap 22. Any contraction of tube 13 after head 17 seats against 18 will cause a compression of the spring, thereby preventing any damage.

As was pointed out, as the outside temperature rises above a predetermined point, it is desired to raise the inside temperature. After adjusting the seat 18 by rod 45, as was previously explained, the plug 43 is rotated (holding rod 45 against rotation) until the tube 47 is resting firmly between the head of plug 35 and the head of plug 43 when the outside temperature is at the desired point, for example 70° F. If the outside temperature rises above 70° F., the tube 47 will expand and force the plunger 27 to the left, hence, reducing the air pressure in line 66 and causing an increase in temperature in duct 51. At this point, it should be remembered that any increase in outside temperature will be reflected by an increase in temperature within the enclosure. As was previously pointed out, tube 13 expands three times as much per degree rise in temperature as does tube 47. Hence, although tube 47 expands to close the valve, tube 13 expands to open it, thereby giving a differential effect.

If, on the other hand, the outside temperature is decreasing, the tube 47 will contract, allowing plunger 27 to move to the right. At the same time, the tube 13 will contract, moving the head 17 to the right. When the outside temperature drops to 70° F., the head 35 will engage the end of rod 45 and any further movement of the seat to the right will be prevented. As the outside temperature falls below 70° F., the tube 47 will continue to contract, just resting lightly between head 35 and plug 43.

With the foregoing in mind, it is evident that by turning plug 43 (without holding rod 45) the entire curve of Fig. 2 may be shifted vertically. The setting of rod 45 determines the point at which the inside temperature will be carried during the winter months, while the adjustment of plug 43 determines the point at which both elements of the thermostat function. By varying the length of the tubes 13 and 47, the slope of the differential temperature line may be varied, but for any given instrument, this slope is constant.

An examination of Figs. 1, 3, 5 and 7 will disclose that one of the thermo-responsive elements is identical in each of the four forms of the invention. Likewise, the hollow casting 14, casting 25, flange 24, plunger 27, diaphragms 29 and 36, clamping rings 33 and 27, and others, have their counterparts in Figs. 3, 5 and 7. Further, the plunger and the diaphragms are mounted in the same manner as was described in connection with Fig. 1, with the exception that in each of the figures, the plug 35 has been replaced by a plug having a similar function but which is slightly different in shape. Since the same reference numerals are used for the same elements in all the drawings, this specification will not be further lengthened by consideration of these parts in connection with the following description of Figs. 3, 5 and 7.

With particular reference to Fig. 3, a flange 70 having a tubular extension 71, formed integrally therewith, is adapted to be threaded to one end of the casting 25. The flange 70 has holes therein adapted to receive the reduced end portions of support rods 40, the rods being fastened as by nuts 41. A flange 72, having a portion of its inner face recessed as at 73a, is securely attached to and supported by the rods 40. A metal tube 73, preferably of the same material as the tube 13, is attached to and supported by, in any desired manner, the inside of the extension 71 of flange 70. Fixedly attached to the other end of the tube 73 is a hollow cap 74, the outer end of which is slightly concave.

An invar rod or the like, 76, having one end threaded, as indicated at 77, passes through a hole 75 in the center of flange 72. The rod 76 also passes through, and is co-axial with, the tube 73 and terminates in a rounded head 78. The head 78 is adapted to seat in a recessed portion of a plug 79, which plug is threaded into the plunger 27 in the same manner as plug 35 of Fig. 1. It is of particular importance to note that the threads 77 of rod 76 do not engage either the flange 72 or the hollow cap 74.

Threaded on the rod 76, and adapted to fit loosely in the recessed portion 73a, is a nut 79 having a convex face which seats in the concave portion of the hollow cap 74. A key 80 allows the nut to move longitudinally, but prevents any rotation. A spring 81 is held in compression between an annular projection 82 of the rod 76 and the shoulders formed on the inside of the hollow cap 74. Threaded on the outer end of rod 76 are two nuts 83 which may be locked in position at any point between the flange 72 and the end of the rod. A projection 84, on the end of the rod, is adapted to receive a key for the purpose of rotating the rod.

The application of a differential thermostat 85, of the type shown in Fig. 3, to an air conditioning system is shown in Fig. 10. The apparatus shown in Figs. 9 and 10 is identical, except that differential thermostat 85 has been substituted for 64. In this case, it is desired to lower the temperature of air supplied to an enclosure, as the temperature outside the enclosure rises above a predetermined minimum. Hence, the element 13 of the thermostat 85 is placed in the duct 51 where it will respond to changes in temperature of the air supplied by fan 50. The element 73 (Fig. 3) is subjected to the influence of outside air supplied to the instrument through a sampling tube 86. As was previously explained, the valve 59 is open when there is no air pressure on the line 66; begins to close as the pressure rises above 2 pounds per square inch and is completely closed when the pressure reaches 5 pounds per square inch. The dampers 56 and 57 are likewise operated in the same manner as was hereinbefore explained.

With reference to Figs. 3 and 10, it is apparent that as the temperature in duct 51 rises, the tube 13 responds by expanding. In so doing, the shoulders 20 engage the crown 19 and draw the head 17 away from its seat 18, thereby allowing the passage of air. Conversely, as was explained in connection with Fig. 1, contraction of the tube 13 returns the head 17 towards its seat.

By moving the plunger 27, hence seat 18 associated therewith, to the right or left, the thermostat may be set so that variations in air pressure due to movement of tube 13 and head 17, will operate the valve 59 and dampers 56 and 57 to maintain constant, at any desired point, the temperature in duct 51. In the instrument of Fig. 3, this is accomplished by rotating rod 76.

As the temperature of the medium, in this case outside air, affecting tube 73 increases, the tube will expand, engage the nut 79 and carry the rod 76, on which the nut is threaded, to the right. The plunger 27, and its component parts, will follow, as was previously noted, thereby opening the valve wider and increasing the pressure of air in discharge passage 32, which pressure affects the dampers to cause a reduction in temperature in the duct 51.

When the temperature affecting 73 decreases, the tube will contract and, through spring 81, transmit motion to the rod 76, thereby carrying the rod to the left. Obviously, this moves plunger 27 to the left, consequently reducing the opening between head 17 and valve seat 18, hence, reducing the air pressure affecting the damper motors. As the outside temperature affecting 73 decreases, the inside temperature will rise. However, when the outside temperature falls below a certain temperature, it is desired to hold the inside temperature constant. This is accomplished by turning the nuts 83 until they just touch flange 72 when the outside temperature has dropped to the desired level. It is apparent that any further movement of the rod 76 to the left is effectively stopped. Further contraction of tube 73 will be taken up by compression of spring 81. Therefore, the thermostatic element 13 alone effects the opening and closing of the valve, hence tending to hold a constant temperature in the duct 51.

The instrument of Fig. 3 was designed primarily to vary the inside temperature, or duct temperature, according to the diagram of Fig. 4. The instrument is set, by adjusting rod 76, to hold a constant duct temperature of 70° F. until the outside temperature rises to 73° F. That is, the nuts 83 are in engagement with flange 72 as long as the outside temperature is 73° or below. As the temperature rises above 73° F. the tube 73 expands so that with each 3° F. rise outside, the inside temperature will be reduced 2° F. It is apparent that the plunger 27 may be set so that tube 13 will tend to hold any desired temperature and that nuts 83 may be positioned to stop the action of tube 73 at any desired point, the temperatures stated being illustrative only.

With reference to Fig. 5, the left hand portion of the instrument is identical with the left hand portions of Figs. 1 and 3, as was previously pointed out. On the right hand end of casting 25, a flange 70 (similar in all respects to flange 70 of Fig. 3), having a tubular extension 71, is threaded or otherwise suitably attached. The tubular extension 71 is adapted to receive and securely hold, in any desired fashion, one end of a metal tube 87, similar to the tube 73 of Fig. 3. The tube 87 is preferably, though not necessarily, of the same metal as tube 13. Securely attached to the other end of tube 87 is a cap 88 having a plug 89 threaded in its head. The plug 89 is drilled axially and has a keyway cut therein.

As was previously pointed out, flange 70 has holes therein adapted to receive and secure (as by nuts 41) the reduced end portions of rods 40. Supported on the other ends of rods 40 is a flange 90. A threaded hole in the center of flange 90 is adapted to receive an externally threaded plug 91.

A slot 92, in the head of plug 91, enables the plug to be rotated, hence, advancing or retracting the plug, depending on the direction of rotation. Through the center of the plug, and along its axis, a smooth hole 93 is drilled.

A metal rod 94, preferably invar metal, but preferably the same material as rods 40, is adapted to pass through tube 87, plug 89, and into the hole 93 in plug 91. One end of the rod 94 abuts against the head of plug 95 (similar in all respects except shape to plug 35 of Fig. 1). On the other end of rod 94 is threaded a collar 96, adapted to hold a spring 97 in compression between itself and the plug 89. Further, the collar 96 is adapted to abut against the inner face of plug 91 in a manner and for a purpose to be hereinafter made clear. A key 98 on the rod 94 cooperates with the keyway formed in the plug 89. An annular collar 99, formed on the rod 94 engages the inner face of plug 89 under certain conditions which will be made clear hereinafter.

The application of the instrument of Fig. 5 to an air conditioning system is shown in Fig. 11. The apparatus shown in Fig. 11 is identical with the apparatus of Fig. 10, except that a differential thermostat 100 (see Fig. 5) has been substituted for 85 of Fig. 10. The operation of the dampers 53 and 54, and where desired, the control of spray temperature in 49, by thermostat 60 to control the dewpoint of air passing through air washer 49 is identical with the operation of the same elements in Figs. 9 and 10. Likewise, the valve 59 is open when there is no air pressure on its diaphragm and closes as the pressure increases to 5 pounds per square inch. Dampers 57 are open a minimum amount when the air pressure in line 66 is 5 pounds per square inch or below, and are open a maximum amount when the pressure increases to 10 pounds per square inch. Further, dampers 56 are fully open from 0 pounds per square inch, start closing at 5 pounds per square inch, and are fully closed at 10 pounds per square inch.

In Fig. 11 the element 13 of thermostat 100 responds to changes in temperature of the air in discharge duct 51. The other temperature responsive element 87, of thermostat 100, is influenced by outside air through sampling tube 86.

Assuming, for illustrative purposes, that rod 94 has been adjusted, hence, plunger 27 and seat 18, so that any movement of tube 13 tends to increase or decrease the air pressure in line 66, thereby causing the operation of valve 59 and dampers 56 and 57 to maintain a constant temperature of 70° F. in duct 51, and further, that the plug 91 has been advanced to a point at which the collar 96 will engage the face of plug 91 when the temperature of air affecting tube 87 has reached 70° F., the operation of thermostat 100 to control the temperature of air in accordance with Fig. 6 is as follows. As the temperature of the air in sampling tube 86 rises, thermostatic element 87 expands. The movement of tube 87 to the right carries the rod, through spring 97 and collar 96, with it. Air pressure on the diaphragm 29, as was pointed out in connection with Figs. 1 and 3, forces the plunger 27 and its related parts to the right, thereby keeping the head of plug 95 constantly against the end of rod 94. A movement of plunger 27 and the valve seat 18 to the right obviously increases the opening between the seat 18 and the head 17, hence, increasing the pressure of air in the line 66. Any increase in pressure, as has been repeatedly pointed out, causes a consequent decrease in temperature in duct 51. As the outside temperature continues to rise, the tube 87 will respond in the above described manner until a temperature of 70° F. is reached. At this point (70°), the collar 96 will engage the face of plug 91. Any further movement of rod 94, to which the collar 96 is threaded, will be impossible. Therefore, any further movement of the plunger 27 and seat 18 becomes impossible. It is apparent that the movement of tube 13 and head 17 alone affects the air pressure in line 66 once the collar rests against 91, hence, once this collar does engage 91, the thermostat 13 will tend to hold a constant temperature in duct 51. Any further expansion of the tube 87 will cause plug 89 to slide along rod 94, to which it is keyed, and compress spring 97. Conversely, as the temperature affecting 87 drops, the tube contracts. At 70° F., the plug 89 engages the annular collar 99 of rod 94 and forces the rod to the left. This movement of rod 94 causes a simultaneous movement of the plunger 27 and seat 18, thereby closing the valve, decreasing the air pressure on line 66 and consequently increasing the temperature within duct 51.

The functions of the adjusting members of the instrument shown in Fig. 5 is most clearly understood by reference to Fig. 6, which shows the variations in temperature in duct 51 of Fig. 11 with respect to variations in outside temperature. The sloping portion of the curve is secured when the instrument is functioning differentially, to wit, when both the head 17 and the seat 18 are subject to movement by their respective expanding members 13 and 87. As was previously explained, the slope (degrees variation in duct temperature per degree variation in outside temperature) is determined by the ratio of the lengths of the expanding members, and for any given instrument, this slope is fixed.

The horizontal portion of the curve represents a constant temperature which will be held regardless of outside temperature. This portion of the curve is obtained when only the head 17 is subject to movement.

The intersection of the sloping portion with the horizontal portion of the curve represents the point at which the stop member functions to prevent further movement of the seat, that is, when collar 96 abuts against the face of plug 91.

In adjusting the instrument, the inner rod 94 is rotated, hence, plug 89, through key 98, is advanced, or retracted, thereby advancing or retracting the rod. Obviously, any movement of the rod moves plunger 27 and the valve seat 18 associated therewith. The valve seat is set, by this means, until air pressure in the line 66 is sufficient to operate valves 59 and dampers 56 and 57, to give a desired temperature (in this case 70° F.). Thereafter, any change in temperature in duct 51 will be reflected by a movement of tube 13 and head 17 to open or close valve 59 and the dampers to restore a temperature of 70° F. in duct 51. It is understood that the temperature 70° F. is merely illustrative and that the instrument could be set in the above manner to hold any desired temperature.

It is further understood that the plug 91 may be advanced or retracted so that it engages the collar 96 at any desired temperature.

With particular reference to Fig. 7, a flange 101, similar in all respects to flange 39 of Fig. 1, is threaded on the end of casting 25. The invar rods or the like, 40 are suitably fastened to flange 101 at one of their ends, the other ends supporting a flange 102. The flange 102 is bored axially and internally threaded to receive a threaded plug 103. The member 104 is screwed into plug 103 tightly enough to lock the two together. The plug 103 is drilled axially, as shown, so as to provide a flange on its inner face. The outer end of 103 is internally threaded to receive an externally threaded member 104. A hole in the member 104 is adapted to receive the threaded end portion of an invar rod or the like, 105.

The other end of the rod 105 has a head 106 formed thereon over which a cap 107 fits. The cap 107 is threaded or otherwise fastened to the end of head 108 which except for shape is identical with plug 35 of Fig. 1.

A hollow cylindrical piece 109 having an enlarged head passes through the bore of plug 103 and terminates in the chamber formed between the flange of 103 and the face of the member 104. An enlarged collar 110 is suitably fastened to the end of 109 to hold a spring 111 in compression between the enlarged head of 109 and the face of plug 103.

Between the rounded head of cap 107 and the rounded head of 109 a tube 112 is loosely supported, but the tube is not attached either to 107 or to 109. The tube 112 is similar to tube 47 of Fig. 1 and is preferably of the same material, for example, brass.

The differential thermostat shown and described in connection with Fig. 7, generally designated 113, is shown in Fig. 12 applied to an air conditioning system. In this case, the thermostat 113 replaces thermostat 60 of Figs. 9, 10 and 11 and is adapted to control the dewpoint temperature of air passing through washer 49 by controlling the operation of dampers 53 and 54 and the mixing valve 114. As contemplated by applicant for this particular case, damper 53, controlling the admission of outside air, is normally open when air pressure on its operating motor 63 is 0 pounds per square inch, starts closing as the pressure increases to 2 pounds per square inch and is closed a maximum amount when the pressure reaches 5 pounds per square inch. Conversely, damper 54 is normally fully closed when the pressure on its operating motor 62 is 0 pounds per square inch starts to open as the pressure increases above 2 pounds per square inch, and is fully open when the pressure reaches 5 pounds per square inch.

The pump 115 is adapted to draw water from the sump of air washer 49 either through the refrigerating machine 116, or through a bypass pipe 117, or through both, and is adapted to deliver the water to spray devices within air washer 49. By varying the amount of water drawn through the refrigerating machine and mixing with it unrefrigerated water (through pipe 117) the temperature of the mixture can be controlled. This is accomplished by means of a three way (or mixing) valve, the construction of which is so well known as to require no lengthy explanation. Suffice it to say that the mixing valve 114 is so arranged in the water circuit that when air pressure on the diaphragm of the valve is below 5 pounds per square inch, pump 115 draws its entire supply of water through pipe 117. As the pressure increases above 5 pounds, the valve operates to allow the pump to draw a part of the water through the refrigerating machine and part through pipe 117 and when the pressure reaches 10 pounds per square inch the entire volume of water will be drawn through the refrigerating machine.

The differential thermostat 113 is mounted on air washer 49 so that element 13 responds to changes in temperature of the air within the washer. The other thermal element 112 is influenced by changes in temperature of outside air through sampling tube 86.

Specifically, the adjustment of 113 is as follows. The seat 18 is adjusted, by rotating member 104 and plug 103, as a unit until the pressure in line 61, connecting the discharge passage of 113 to the mixing valve 14 and damper motors 62 and 63, is just sufficient to maintain the dewpoint temperature in washer 49 at any desired point. Rod 105 is then rotated until head 106, at 70° F. (or any other desired temperature) firmly engages the shoulders of cap 107. In adjusting the instrument, tube 112, at the desired cut off temperature (70° F. in this case) should be firmly engaged between 107 and 109, and the collar 110 should be resting against the flange of plug 103, so that any expansion of the tube will hold 107 against the head 106 and compress spring 111. Further, any contraction of 112 will allow the head 107, hence seat 118, to move to the right under the influence of air pressure in chamber 26.

Assuming that the instrument has been adjusted as above described so that the element 13 tends to hold a constant temperature of 60° F. in air washer 49, and the tube 112 holds cap 107 against 106 when the outside temperature is 70° F. or above, the operation of the instrument to control the dewpoint according to the schedule of Fig. 8 is as follows.

It is apparent that as long as the outside temperature is above 70° F., the tube 112 will hold 107 firmly against head 106, hence, only the thermostatic element 13 will function. Assuming that the outside temperature is above 70° F., any rise in temperature in the washer 49 will cause element 13 to expand and open the air valve, thereby increasing the air pressure in line 61. An increase in pressure in 61 will tend to close the fresh air damper 53 and open return air damper 54. If this is not sufficient to bring the temperature in washer 49 down to the desired level, the valve 114 will act to allow the passage of water through the refrigerating machine. If, however, the temperature in the air washer was below the desired level, element 13 would contract, thereby reducing the pressure in line 61. A reduction in pressure would first act on valve 114 to reduce the amount of refrigerated water. If the temperature were still too low, damper 54 would start to close and 53 to open.

Assuming that the outside temperature is falling, it is apparent that tube 112 will contract. The spring 111 will first expand until collar 110 rests against the flange of plug 103. At 70° F., as was explained, the collar will be against the flange and the tube will be holding 107 firmly against head 106. Any further contraction of tube 112 will allow the shoulders of 107 to move away from 106 (under the action of air pressure on diaphragm 29) hence, moving the valve seat 18 away from head 17. This increase in pressure will cause 53 to close, 54 to open and then it will affect valve 114 to allow the passage of water through the refrigerating machine 116 as was previously explained.

By way of summarization, each of the instruments illustrated and described includes two thermostatic elements operative responsive to temperature changes in two mediums, thus to provide differential temperature control. However, in practice, differential control is not desirable under all conditions. Thus, an adjustable stop element is provided for limiting the effective operation of one of the thermostatic elements. As is apparent from the foregoing description, whenever the stop element prevents a movement of the valve seat, then only one of the thermostatic elements is operative as a control means. Thereafter, the instrument operates as a straight thermostat, i. e., it responds to temperature changes in one medium only. Consequently, then, the stop element serves to change the entire character of the instrument, i. e., from a differential to a straight thermostat, and vice versa.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent of the United States is:

1. A control device of the character described having a plurality of movable members adapted to regulate the flow of fluid, one of said members being under the control of a movable element adapted to contract and expand through a certain distance within a certain range of temperatures, the other member being under the control of another movable element adapted to contract and expand through a different distance within the same range of temperatures and an adjustable stop element for terminating the movement of said other member.

2. In a control device of the character described, a pressure regulating means, said means comprising a valve seat and a closure member, means responsive to temperature changes in one medium for operating said closure member, means operative responsive to temperature changes in a second medium for operating said seat member, and means for stopping the movement of said seat member whenever the temperature of said second medium attains a desired point.

3. In a control instrument, a valve, a first thermostatic member, a second thermostatic member, said members being adapted to operate said valve responsive to temperature changes in mediums affecting said members, and means for stopping the movement of one of said members when the medium to which it responds attains a predetermined temperature, said means being adjustable whereby the point at which said member is stopped may be varied.

4. In a control instrument, a valve seat, a closure member cooperating with said seat, means operative responsive to temperature changes in one medium for moving said seat, means operative responsive to temperature changes in a second medium for moving said closure member, said means being adapted to move equal distances responsive to unequal temperature changes and adjustable means for stopping the movement of the seat whenever the temperature of the first medium attains a desired point whereby the instrument provides differential thermostatic control prior to the stoppage of said seat and straight thermostatic control during the stoppage of said seat.

5. In a control device of the character described, a valve comprising a movable seat and a movable closure member, a first thermostatic element responding to temperature changes in a first medium for moving said seat, a second thermostatic element responding to temperature changes in a second medium for moving said closure member, means for stopping the movement of said seat whenever the temperature of the first medium rises above a desired point, said means being adjustable to vary the point at which the movement of said seat is stopped, and an escapement means whereby the first thermostatic element may continue to move after the seat has been stopped.

6. A control device of the character described having a plurality of movable members adapted to regulate the flow of liquid, one of said members being movable under the control of a first thermostatic element having a certain rate of expansion, the other member being movable under the control of a second thermostatic element having a different rate of expansion, said first element being operative responsive to temperature changes in a first medium, said second element being operative responsive to temperature changes in a second medium, and an adjustable stop element for limiting the movement of one of said movable members when the temperature affecting its associated thermostatic element attains a desired point.

7. In a control device of the character described, a valve comprising a movable seat and a movable closure member, a thermostatic device operative responsive to temperature changes in a first medium for moving said seat, a thermostatic device operative responsive to temperature changes in a second medium for moving said closure member, and means for stopping the movement of said seat whenever the temperature of said first medium attains a desired point, said means being adjustable to vary the point at which said seat is stopped.

8. In a control device of the character described, a valve comprising a movable seat and a movable closure member, thermostatic means operative responsive to temperature changes in a first medium for moving said seat member, thermostatic means operative responsive to temperature changes in a second medium for moving said closure member, and means for stopping the movement of said seat whenever the temperature of said first medium attains a desired point.

9. In a thermostatic control device, a valve comprising a movable closure member and a movable seat, thermostatic means operative responsive to temperature changes in one medium for moving said closure member, thermostatic means operative responsive to temperature changes in a second medium for moving said seat, and means for stopping the movement of said seat whenever the temperature of the first medium attains a desired point whereby the device provides differential thermostatic control prior to the stoppage of said seat and straight thermostatic control during the stoppage of said seat.

10. In a control valve, a valve seat, a closure member, means operative responsive to temperature changes in a first medium for moving said seat, means operative responsive to temperature changes in a second medium for moving said closure member, said means being adapted to move equal distances responsive to unequal temperature changes, and means for stopping the movement of said seat whenever the temperature of said first medium attains a predetermined point, said last means being adjustable to vary the temperature at which said seat is stopped.

11. In a control device, a valve seat member, a closure member, a first thermostatic element for moving the seat member, a second thermostatic element for moving the closure member, and means for stopping the movement of one of said members at a predetermined temperature, said means being adjustable to vary the point at which the member is stopped, whereby the instrument provides thermostatic control in response to temperature changes in two mediums prior to the stoppage of the member, and thermostatic control in response to temperature changes in one medium after the stoppage of the member.

WILLIAM G. HILLEN.
FREDERIC W. BAILEY.